S. L. WIEGAND.
GAS ENGINE.
No. 44,572.  Patented Oct. 4, 1864.
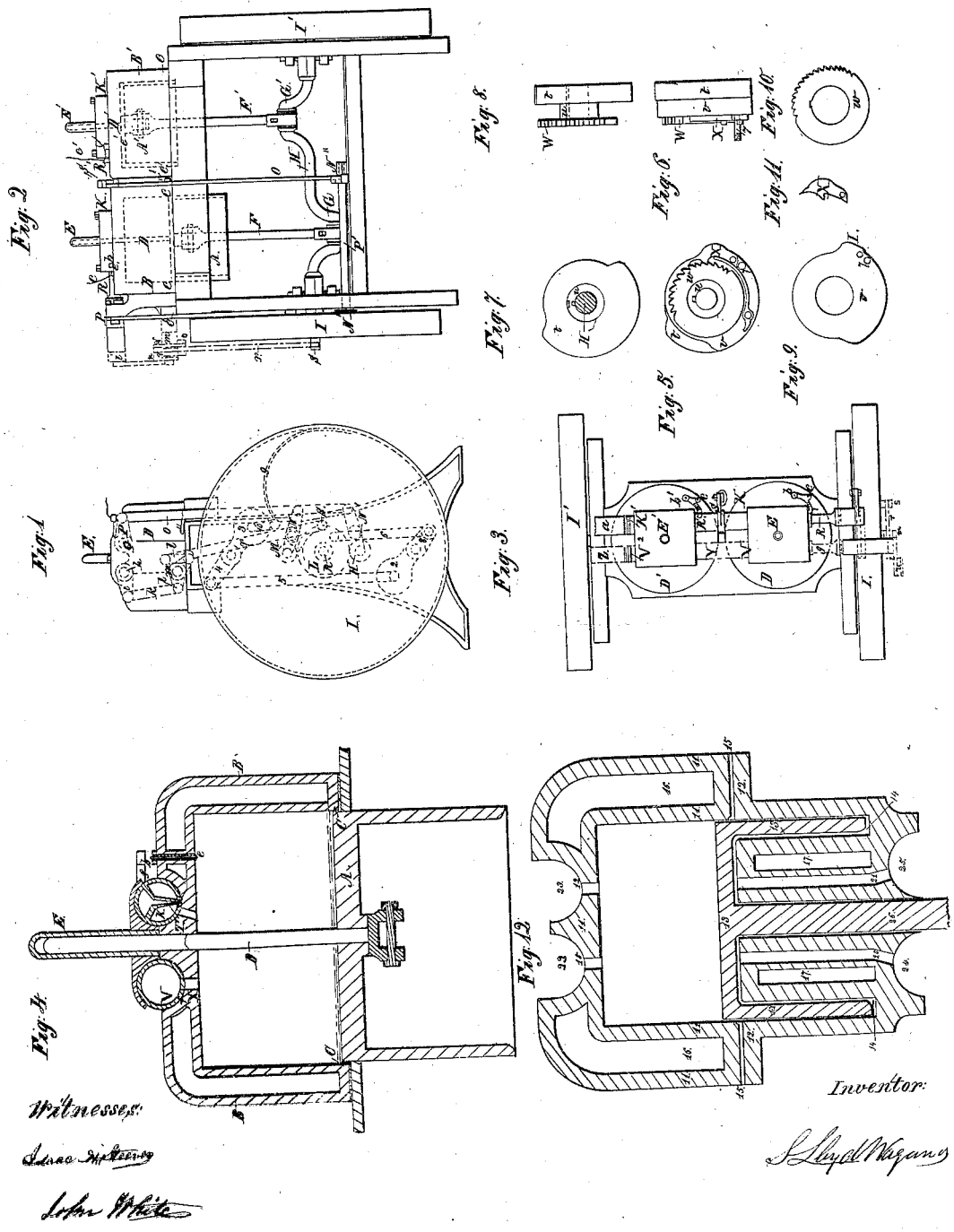
Witnesses:
Inventor:

ary motion is imparted to the shaft H by the rods F and F' and the cranks G and G', in a manner familiar
UNITED STATES PATENT OFFICE.

S. LLOYD WIEGAND, OF PHILADELPHIA, PENNSYLVANIA.

IMPROVEMENT IN GAS-ENGINES.

Specification forming part of Letters Patent No. 44,572, dated October 4, 1864; antedated September 16, 1864.

*To all whom it may concern:*

Be it known that I, S. LLOYD WIEGAND, of the city of Philadelphia, and State of Pennsylvania, have invented certain new and useful improvements in engines for producing motive power by the explosion of mixtures of inflammable gas and air; and I do hereby declare that the following is a full and exact description thereof, reference being had to the drawings annexed and making part of this specification and the letters of reference marked thereon.

The nature of my invention consists in protecting the joint of the piston or plunger of the engine from the deposit of carbon which is precipitated from illuminating-gas when imperfectly consumed, and also in regulating the velocity of such engine by a system or method which economizes the gas-supply, and at the same time renders the motion of the engine more nearly uniform than has heretofore been done, besides which, improvements involving general methods of operation, there are other minor improvements in detail of construction, which facilitate and thus cheapen the cost of manufacture and improve the durability of the apparatus.

Figure 1 is an elevation of the side of the engine. Fig. 2 is an elevation of the front of the engine. Fig. 3 is a plan of the engine. Fig. 4 is a section of the cylinder B and valves. The remaining figures represent parts of the engine in detail, and are hereinafter described.

A and A' are hollow plungers, which fit in cylinders B and B', and are made air or gas tight by means of a packing at C and C', these pistons or plungers A and A' are guided in their rectilinear motion by the rods or stems D and D', fastened to A and A', and fitting in the hollow guides or tubes E and E'. Upon the joints formed by the packing at C and C', against the plungers A and A', I introduce a supply of some fluid of greater specific gravity than the carbon deposit which is precipitated by the imperfect combustion of illuminating-gas. The action of this fluid is threefold: First, it keeps the joint air-tight; second, it lubricates the joint; third, it floats off from the joint a sediment or precipitate, which would otherwise wear out and impair the surfaces of the packing and plunger. These pistons A and A' are connected by rods F and F' to the cranks G and G', which are formed diametrically opposite in the shaft H, and upon mixtures of air and gas being alternately exploded in the cylinders B and B', rotary motion is imparted to the shaft H by the rods F and F' and the cranks G and G', in a manner familiar to every machinist. I and I' are fly-wheels for the purpose of equalizing the rotative motion of the shaft H, which would otherwise be impulsive and unsteady. The rims or peripheries of the fly-wheels I and I' are made broad, so as to answer the purpose of band-wheels or pulleys for imparting motion to machinery.

The gas is admitted into the cylinders by means of the partially rotative valves K and K', which receive motion from a compound cam, L, upon the shaft H, through the medium of the roller M upon the lever N, working the rod O, connected with the rock-arm P upon the shaft Q, which, by the coupling-shaft R, operates the valve K, and by the means of the roller M' upon the rock-arm N' upon the rock-shaft P', bearing at its other extremity the rock-arm N'', moving the rod O', connected with the rock-arm S, forming part of the tubular coupling-shaft R', operates the valve K', the gas in passing into the cylinder of the engine mingles with air in the manner which is shown in Fig. 4, which shows the cylinder and valves in section. The jet-tubes T in the valves K and K' have around them a space communicating with the atmosphere, and upon gas passing through the tubes T in the direction of the arrow, currents of air are induced to flow with it through the induction-port U into the cylinder B.

The eduction or exhaust valves V and V' are tubes, and have slots or ports X, which communicate between the interior of the cylinder and the tube when the valves V and V' are rotated to such a position as to cause the slot X' to coincide with the exhaust-port X of the cylinder B. This will be seen most easily in Fig. 4.

The exhaust-valves V and V' are connected together by means of a hollow coupling-shaft, Y, which, while it transmits rotative motion, permits a slight variation in the axial lines of the valves. This shaft Y at the same time forms a connection from the valve V to the valve V', which in turn is connected to the escape-pipe Z, and the hollow rock-shaft R' forms a communication from the valve K' to the valve K, but imparts motion to the valve K' only. Thus it will be seen that a communication from the supply pipe $a$ is established through the valve K' and the rock-shaft R to the valve K.

$b$ and $b'$ represent conducting-points, which convey an electric current from the wires $c$ and $c'$ to the insulated wires $e$ and $e'$, for the purpose of igniting or exploding the contents of the cylinders D and D'. These conducting-points $b$ and $b'$ are supported and operated by levers $f$ and $f'$, which are fastened to the rock-shafts or couplings R and R'. The levers $f$ and $f'$ are composed in whole or in part of some electrical non-conducting substance, so that the current transmitted through the wires $c$ and $c'$ can only be conveyed away by the points $b$ and $b'$ when in contact with the insulated wires $e$ and $e'$.

The exhaust-valves are operated by a mechanism consisting of a coupling-shaft, $g$, and rock-shaft $h$, having a lever, $i$, secured upon it and operated by the rod $k$, which rod $k$ is moved by an arm, $l$, on a rock-shaft, $m$, which describes an arc nearly or quite semicircular. The effect of the semicircular motion of the rock-shaft $m$ is to give the rod $k$ and the parts operated thereby a very rapid motion during the middle of the stroke and a very slow motion near the commencement and termination of the stroke, which effect is highly desirable, because the valves V and V' are opened and closed quickly, and have very little motion during the stroke of the piston when the valves are subjected to pressure. Much of the friction and the consequent wear of the valves which would otherwise occur is thus avoided.

The rock-shaft $m$ receives motion by means of the arms $n$ and $o$, which are connected by the short links $p$ and $q$ to the rod $r$, worked by an eccentric or crank pin, $s$, upon the wheel I. It will be seen upon inspection that the short links are in central length equal to the distance between the centers of the pins by which they are attached to the rod $l'$. The combined effect of the levers or arms $n$ and $o$ and short links $p$ and $q$ is to give a much greater angular velocity to the rock-shaft $m$ during the middle of its throw than would be due to a connection of the rod $r$ made to an arm or lever with the center of attachment of the rod $r$ in a position midway in the arc described by arms $n$ and $o$.

The compound cam L is shown enlarged in Figs. 5 and 6, and the principal details of it are shown separately in Figs. 7, 8, 9, 10, and 11. It consists of a cam, $t$, secured upon the shaft H, and having a hub, $u$, upon which fits a cam, $v$, so as to be susceptible of rotation. Upon the hub $u$ is securely fastened the ratchet-wheel $w$, into which a pawl, $x$, fastened to the cam $v$, catches whenever any pressure is exerted by the rollers M or M', (shown in Fig. 1,) upon the pawl $x$, thus compelling the cam $v$ to rotate with the ratchet $w$; but whenever the pawl $x$ is relieved of the pressure, the spring $z$ lifts the pawl $x$ out of the teeth of $w$, and the cam $v$ is free to rotate upon the hub $u$. When the rollers M and M' bear upon the larger part of the cam $t$, the valves K and K' are closed, and open when they bear upon the smaller part of the cam. The valves K and K' are closed sooner or later in the stroke of the pistons A and A', by the cam $v$, according to the position in which $v$ may be. There is a projection upon the cam $v$, (marked I in Fig. 9,) which moves the rollers M and M' and the levers, rods, and rock-shafts and valves therewith connected, so far as to cause contact of the conducting-points $b$ and $b'$ with the insulated wires $e$ and $e'$ immediately after the closing of the valves K and K'.

The position of the cam $v$ relatively to the cam $t$ is controlled by a centrifugal governor, consisting of two weights, 2 and 3, connected to each other by the lever 4, which forms a part of the weight 3, and a link, 5, which, by their centrifugal force moving them outward from the shaft H, move the cam $v$ by means of the link 6, connected at one end by the pin $y$ to the cam $v$, and at the other end to the lever 8, which forms a part of the weight or ball 2. The centrifugal force of the weights 2 and 3 is counteracted by a spring, 9, connected by a link, 10, to the weight 3, and thus the position of the cam V is regulated and controlled by the variations which may occur in the velocity of the engine, changing the point of equilibrium between the centrifugal force of the weights 2 and 3 and the elasticity of the spring 9, and by the variations which thus occur in the position of the cam $v$ the point of closing of the valves K and K' in the stroke of the pistons A and A' is varied and controlled, while at the same time the governor is protected from changes in position by the resistance made by the friction of the valve-gearing by means of the pawl $x$ and ratchet $w$. The effect of this governing of the point of closing of the valve is an economy in the consumption of gas, and regularity in the velocity of the engine. The rollers M and M' are kept in contact with the cam L by means of springs 11 and 12, applied to the connecting-rods O and O', by which the valves are worked. The same effect may be accomplished by means of weights, but not so well as by springs. An advantage is realized by controlling the duration of the flow of gas and air to the cylinder by means of a regulator, because the relative proportions of air and gas entering and mixing in the cylinder are maintained uniformly the same, which would not be the case were the pressure of gas varied by means of a throttle-valve, as it is well known that the currents of air induced by central jets of gas or air in tubes do not in volume or velocity correspond with the pressure and velocity of the central jet in a direct and uniform ratio.

The cylinders B and B' of this engine are made with double walls, and have a water circulation between their walls for the purpose of cooling them, as may be seen upon reference to Fig. 4. The electric current used for igniting the gas is produced from a Bunsen battery and a Rumkorf coil connected therewith, such as are commonly used for the purpose detonating by electric currents.

I will now proceed to describe the operation of this engine. The piston A, being up, commences to descend and the exhaust-valve V closes and the induction-valve K opens and air and gas flow in together in the cylinder A, when the valve K closes and a current of electricity through the insulated wire c ignites the gas and air in the cylinder B and propels the piston A through the balance of the stroke. When the engine exceeds in velocity that with which it is designed to run, the cam v closes the valve K earlier in the stroke and admits a smaller quantity of gas, and when the velocity diminishes the cam v moves back and allows a larger supply of gas to enter the cylinder, the engine regains its velocity, and the same operation taking place in the cylinder B' alternately with the cylinder B the rotative motion of the shaft is continued. The exhaust-valves V and V' remain open during the ascent of the respective pistons in the cylinders with which they are connected. The products of combustion generated in the cylinders escape to the pipe Z. Any deposit of carbon which may be precipitated in the cylinders floats off upon the top of the fluid contained in them through the exhaust-valves and out of the pipe Z.

The connections of the coupling-shaft Y and the valves V and V' and valves K and K' and coupling R are made gas-tight by means of collars of vulcanized india-rubber; but they may be made tight by means of stuffing-boxes.

Fig. 12 exhibits a modification of this invention in the construction of the cylinder and plunger, by which means the cylinder becomes double-acting. 11 is the cylinder in the upper part, having a water-jacket, 16, and valve-seat for induction and eduction, (marked 22 and 23,) and induction and eduction ports 18 and 19. 13 shows the piston or plunger connected securely to the piston rod 26, and working air-tight through the packing-ring 15. Thus far as described it does not differ materially from the form previously specified. Below the cylinder 11 is another, (marked 12,) containing an annular groove, 14, into which the plunger 13 works, and having a water-space, 17, for refrigerating purposes, and induction and eduction valve seats 24 and 25 and induction and eduction ports 20 and 21, which perform the same functions underneath the plunger as those in the cylinder 11 do above it. By filling the groove 14 with a fluid specifically heavier than the deposit of matter resulting from imperfect combustion the working joint of the plunger or piston is protected from injury therefrom. It is obvious to any skilled engineer that this form of cylinder and piston is double-acting.

What I claim as my invention, and desire to secure as such by Letters Patent, is—

1. Protecting the piston, or its equivalent, from deposits of residuum in the cylinder by means of a fluid of greater specific gravity than the residuum, substantially in the manner shown and described.

2. Combining the conducting electrical points or circuit-closing apparatus with the valve-gear so that the circuit is closed after closing the valve, substantially as shown and described.

3. Combining the regulator with the induction-valves so as to regulate the duration of flow of gas and air or other explosive mixture to the cylinder, or its equivalent, by the velocity of the engine, and thus to control the velocity of the engine, substantially in the manner shown and described.

4. The induction-valves, when constructed and used substantially as described.

5. The eduction-valves, when constructed and used substantially as described.

6. Imparting motion to the valves by means of the coupling-shafts, in the manner hereinbefore set forth and described.

S. LLOYD WIEGAND.

Witnesses:
ISAAC H. STEEVER.
JOHN WHITE.